Aug. 26, 1924.

A. M. HAANSTAD 1,506,723

DIRIGIBLE HEADLIGHT

Filed Oct. 30, 1922  2 Sheets-Sheet 1

Inventor
Alfred M. Haanstad

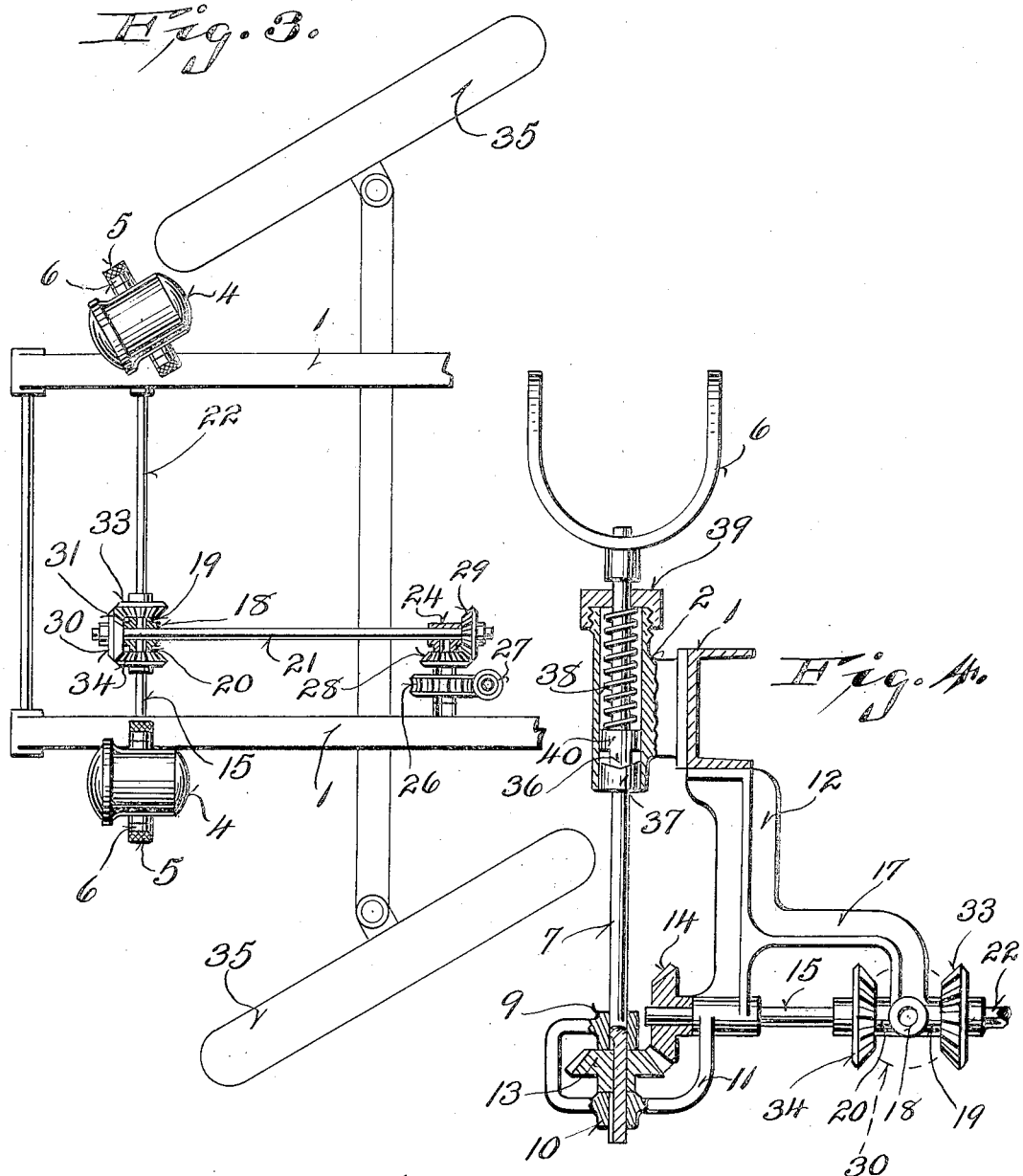

Patented Aug. 26, 1924.

1,506,723

UNITED STATES PATENT OFFICE.

ALFRED M. HAANSTAD, OF EAU CLAIRE, WISCONSIN.

DIRIGIBLE HEADLIGHT.

Application filed October 30, 1922. Serial No. 597,877.

*To all whom it may concern:*

Be it known that I, ALFRED M. HAANSTAD, a citizen of the United States, and resident of Eau Claire, in the county of Eau Claire and State of Wisconsin, have invented certain new and useful Improvements in Dirigible Headlights; and I do hereby declare that the following is a full, clear, and exact description thereof.

This invention relates to automobile headlight construction and is particularly directed to a dirigible headlight.

In dirigible headlights, as heretofore constructed, difficulty has been experienced in properly illuminating the roadway or path, along which the car is actually travelling, with the result that dark areas exist in front of the machine which contribute materially to the difficulties of night driving.

This invention is designed to overcome the above difficulties and objects of such invention are, therefore, to provide dirigible headlights for automobiles which properly illuminate all necessary portions of a roadway while a turn is being executed, which brightly illuminates the road immediately in front of the machine, which illuminates both the road which is being left and the road into which the machine is turning.

Further objects are to provide a dirigible headlight construction, which is sturdy, reliable in operation, and one in which no delicate or difficultly produced parts are employed.

An embodiment of the invention is shown in the accompanying drawings, in which:—

Figure 3 is a plan view partly in section of the structure shown in Figure 1.

Figure 4 is an enlarged, sectional view through one of the dirigible head light supports and the associated mechanism.

Figure 5 is a view of the mutilated gear for operating the headlights.

Referring more particularly to the drawings, it will be seen that the headlights are mounted upon opposite sides of the automobile and are supported from the side bars 1 thereof by means of brackets 2. These headlights are connected by suitable mechanism, hereinafter to be described, with the steering post 3 of the automobile so that the headlights are selectively operated from the steering post to turn inwardly the head light upon that side from which the machine is turning, that is to say upon the side most remote from the center about which the machine is being turned.

Figure 1:
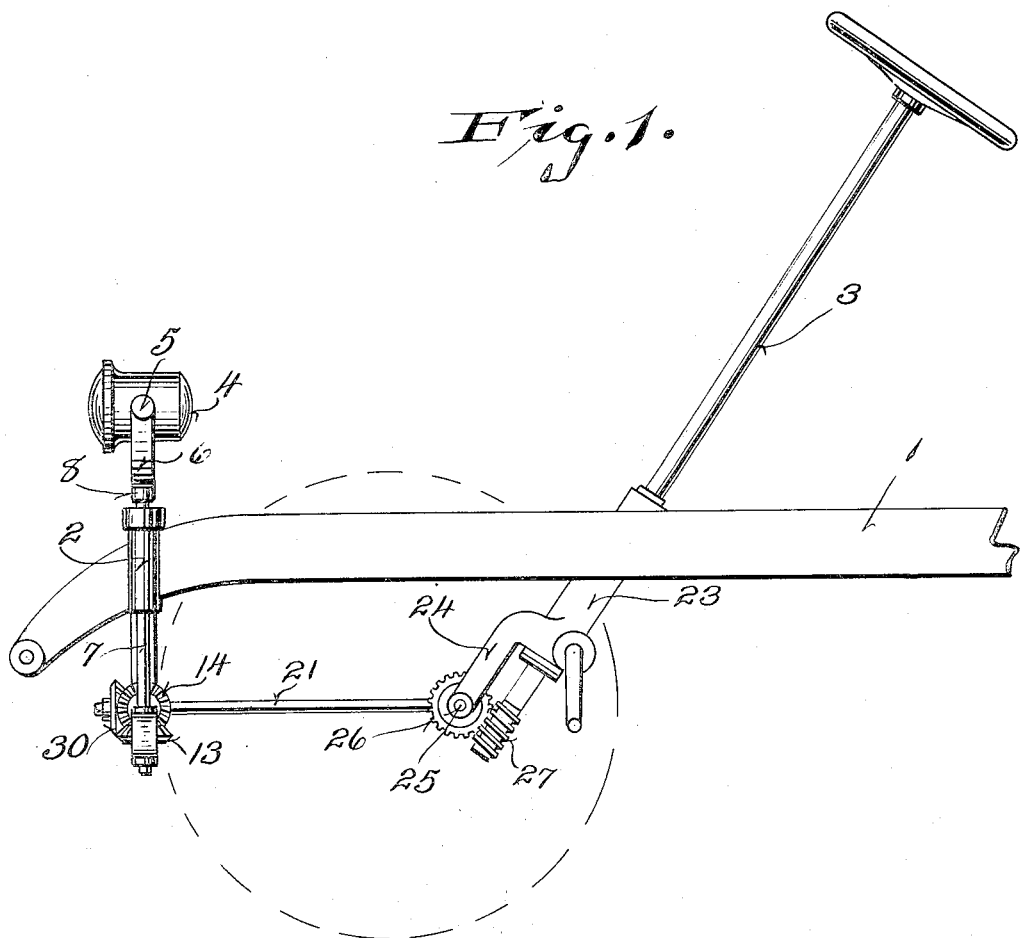
Figure 1 is a side elevation of a portion of an automobile showing the dirigible headlight in position.
Figure 2:
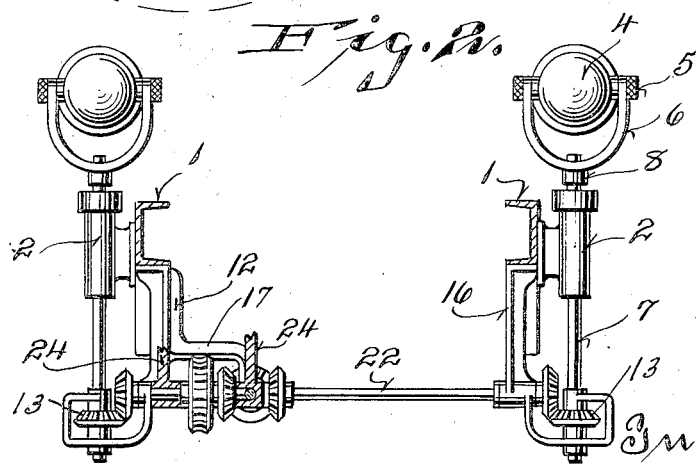
Figure 2 is a front elevation, partly in section, of the structure shown in Figure 1.

The headlights 4 are mounted by means of suitable trunnion members 5 within the forked frame 6. They are identical in construction and one will therefore be described in detail. This frame 6 is rigidly secured to the upper end of a shaft 7 which passes through the bracket 2—the shaft being provided with an enlargement 8 upon which the frame 6 seats, if desired. The lower portion of the shaft, as may be seen from Figure 4, is carried within upper and lower bearings 9 and 10 formed in an extension 11 of the bracket 12, such bracket being secured to the under side of the side frame. This lower end of the shaft is loosely splined to a bevel gear 13, which is in mesh with a second bevel gear 14 rigidly mounted upon a short shaft 15. The brackets 12 and 16, see Figure 2, are substantially alike except for a laterally projecting arm 17 formed upon the bracket which is mounted upon the side of the automobile adjacent the steering post. This laterally extending arm 17 is provided with bearings 18, 19, and 20, which respectively support a longitudinal shaft 21, a transverse shaft 22 for the right hand light, and the transverse shaft 15, previously described, for the left hand light.

The steering post bracket 23 has a forwardly extending arm 24 provided with a bearing 25 upon which a worm wheel 26 is mounted. This worm wheel meshes with a worm 27 formed upon the lower end of the steering post 3. Rigidly secured upon the worm wheel shaft is a bevel gear 28 which meshes with a corresponding bevel gear 29 rigidly secured upon the longitudinal shaft 21.

The forward end of the longitudinal shaft 21 carries a mutilated gear 30, which, as may be seen from Figure 5, is provided with a plurality of teeth 31 and a flat surface 32, the flat surface extending throughout a considerable portion of the gear. When the steering post is in its neutral position, that is to say, when the machine is adapted to travel directly forwardly, the gear 30 is so turned that the teeth 31 are located upon the upper side and substantially centrally thereof. Upon the juxtaposed ends of the alined shafts 15 and 22 a pair of bevel gears 33 and 34 are rigidly secured and are positioned so as to mesh with the teeth 31 of the mutilated gear when such gear is rotated.

Means for temporarily retaining the headlights in their normal stationary position may comprise a cam-like member 36 carried by shaft 7 and cooperating with a cam faced member 37 carried by the bracket 2. These members are yieldingly forced into engagement by means of a helical spring 38 surrounding the shaft 7, bearing at its upper end against the cap 39 secured to the bracket 2 and at its lower end upon an enlargement 40 carried by the shaft 7 and integral with the cam member 36.

The operation of the apparatus is as follows:—Assuming that the steering post 3 has been rotated in a counter-clockwise direction to effect a left hand turn, as may be seen from the position of wheels 35 in Figure 3. Under these conditions shaft 21 is rotated so as to move the teeth 31 of the mutilated gear to the right, thereby engaging and rotating the gear 33. This rotates the shaft 22 and through the bevel gears 14 and 13, which are similar for both headlights, the shaft 7 is given a part rotation to cause the headlight carried thereby to be directed inwardly. This causes the beam to be projected across the roadway and into the roadway into which the machine is turning. The reverse movement of the steering post obviously causes the other headlight to move while the headlight which formerly moved is now stationary. It will be seen that the headlight upon the side of the vehicle closest to the center about which the machine is turning, remains in its fixed position and directs a beam forwardly of the machine.

It will be clearly seen that the headlights project intersecting beams which cross in front of the machine whenever the machine is being turned. It will also be seen that the headlight most closely adjacent the turning point of the machine directs a beam forwardly and the one most remote from the point about which the turn is made directs a beam angularly in front of the machine and into the roadway into which the machine is being turned. This peculiar arrangement of cooperating headlights is such that the space immediately ahead of the machine is brilliantly illuminated and no dark areas exist. Also illumination is afforded both roadways at the instant of turning while the area immediately in front of the automobile is also brilliantly illuminated.

It will thus be seen that dirigible headlights have been provided for automobiles, so organized that no dark areas are left in front of the machine while it is making a turn. It will also be seen that the mechanism employed is comparatively simple and is of very sturdy construction and not likely to be easily damaged.

Various changes may be made in the details of construction, as for instance other means than that shown may be employed for the cam mechanism to hold and yieldingly aid in returning the lights to their normal straight-ahead position. These are only a few of the many changes in structural details that obviously might be resorted to without departing from the spirit of the invention, and it is therefore to be understood that the invention is to be limited only as set forth in the appended claims.

I claim:—

1. The combination of an automobile having a steering mechanism, a pair of spaced headlights, a pair of alined shafts operatively connected to said headlights and having juxtaposed ends, a third shaft arranged at an angle to said first mentioned shafts, means for operatively coupling said third shaft with the steering mechanism, a pair of gears carried by the juxtaposed ends of said first mentioned shafts, and a mutilated gear carried by said third shaft and adapted to engage either of said first mentioned gears, whereby upon turning the automobile the light upon the side from which the automobile is turned is directly inwardly.

2. The combination of an automobile having a steering mechanism, a pair of spaced headlights, a pair of alined shafts operatively connected to said headlights and having juxtaposed ends, a third shaft arranged at an angle to said first mentioned shafts, means for operatively coupling said third shaft with the steering mechanism, a pair of gears carried by the juxtaposed ends of said first mentioned shafts, a mutilated gear carried by said third shaft and adapted to engage either of said first mentioned gears, whereby upon turning the automobile the light upon the side from which the automobile is turned is directed inwardly, and resiliently pressed cam means tending to retain the headlights in neutral position.

In testimony that I claim the foregoing I have hereunto set my hand at Eau Claire, in the county of Eau Claire and State of Wisconsin.

ALFRED M. HAANSTAD.